Dec. 19, 1950     C. S. VAN LOON     2,534,486
SHARPENER FOR MEAT BLOCK SCRAPERS
Filed March 3, 1949
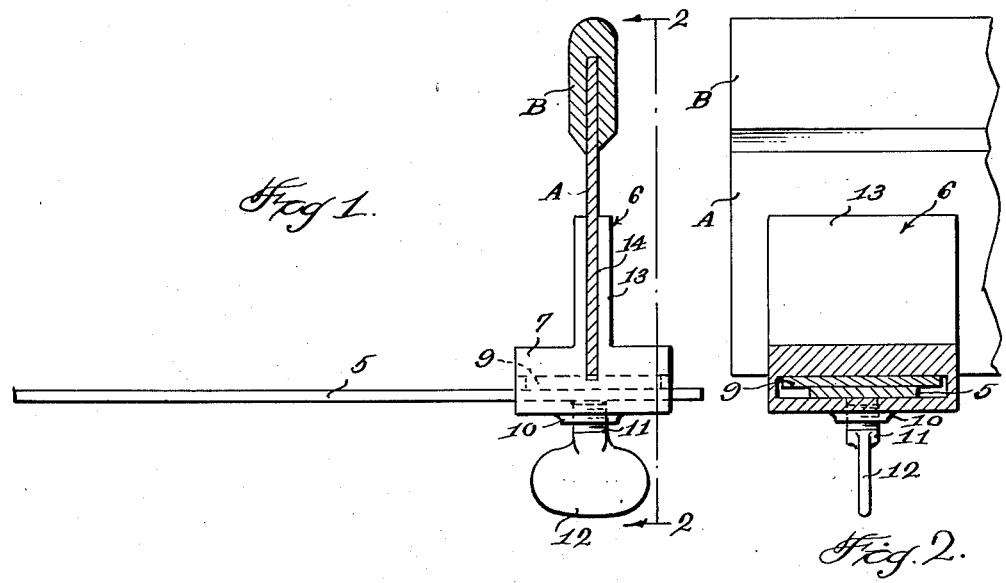
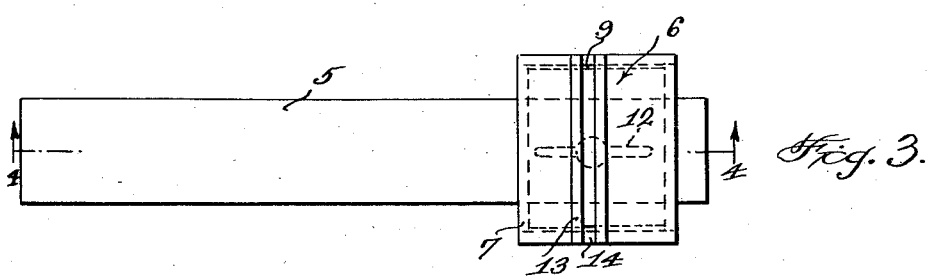
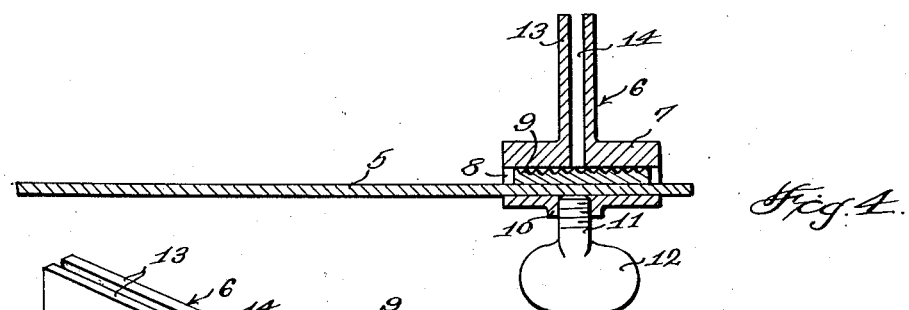
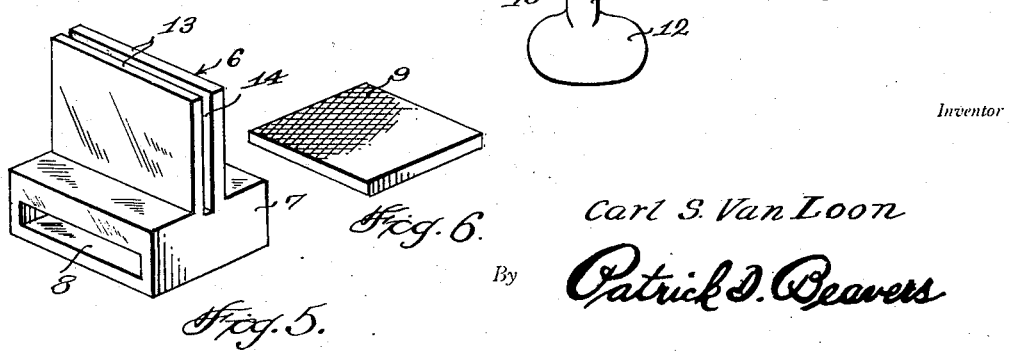
Inventor
Carl S. Van Loon
By Patrick D. Beavers
Attorney Patented Dec. 19, 1950

2,534,486

UNITED STATES PATENT OFFICE 2,534,486

SHARPENER FOR MEAT BLOCK SCRAPERS

Carl S. Van Loon, Salina, Kans.

Application March 3, 1949, Serial No. 79,405

1 Claim. (Cl. 76—82)

The present invention relates to improvements in sharpeners for meat block scrapers.

The principal object of the present invention is to provide a simple and inexpensive sharpener for meat block scrapers which will permit a block scraper to be sharpened in only a few strokes.

Another important object of the invention is to provide a sharpener for meat block scrapers which can be easily adjusted to meet various conditions.

Still another object of the invention is to provide a sharpener of the character stated wherein the file element can be adjusted as its ribs become worn.

These and various other objects and advantages of the invention will become apparent to the reader of the following description.

In the drawing:

Figure 1 is a side elevational view of the sharpener showing a scraper (in section) disposed therein.

Figure 2 is a fragmentary sectional view taken substantially on line 2—2 of Figure 1.

Figure 3 is a top plan view of the sharpener without the scraper.

Figure 4 is a longitudinal sectional view taken substantially on line 4—4 of Figure 3.

Figure 5 is a perspective view of the guide.

Figure 6 is a perspective view of the file.

Referring to the drawing wherein like numerals designate like parts, it can be seen that numeral 5 denotes an elongated handle, preferably of metal and on which is disposed a scraper guide generally referred to by numeral 6, the guide 6 is composed of a block 7 having a transverse opening 8 therethrough for receiving one end portion of the handle 5 and also a substantially square file 9. An internally threaded boss 10 depends from the block 7 and opens into the opening 8 to receive the threaded shank 11 of a set screw 12. The set screw 12 is driven against the overlying part of the handle 5 and clamps the handle 5 and file 9 against the inside of the block 7, as is apparent in Figure 4.

The block 7 has a raised portion 13, slotted downwardly as at 14 and into the opening 8. This defines a guideway for the reception of the blade A of a meat block scraper, these scrapers generally having a hand grip portion B.

It can now be seen in the operation and use of this scraper, that the handle 5 and file 9 are placed in the opening 8 of the block 7 and the set screw 12 driven upwardly to clamp these elements together, with the ribbed face of the file 9 underlying the guideway or slot 14.

The scraper blade is now inserted in the guideway 14 and reciprocated against the file 9, with the result that with a few strokes the lower edge of the blade A is sharpened and ready for use in scraping a meat block.

The handle 5 may be pressed against the meat block for holding the sharpener in desired position.

While the foregoing description sets forth the invention in specific terms, it is to be understood that numerous changes in the shape, size and materials may be resorted to without departing from the spirit and scope of the invention as claimed hereinafter.

Having described the invention what is claimed as new is:

A sharpener comprising a block having an opening horizontally therethrough, a file disposed removably within the opening, the top of the block being slotted over said file, a pair of upstanding guide walls, one at each side of the slot for guiding a meat block scraper, when being reciprocated upon the file, an elongated handle bar disposed with one end in the opening of the block and below the file, and a set screw feedable through the bottom of the block to engage the handle bar and clamp said file against the block at the upper side portion of said opening.

CARL S. VAN LOON.

REFERENCES CITED

The following references are of record in the file of this patent:

UNITED STATES PATENTS

| Number | Name | Date |
|---|---|---|
| 173,535 | Fisher | Feb. 15, 1876 |
| 484,201 | Holland | Oct. 11, 1892 |
| 493,174 | McClure | Mar. 7, 1893 |
| 597,163 | Gowdy | Jan. 11, 1898 |
| 1,388,659 | Mitchell | Aug. 23, 1921 |
| 1,594,246 | Decherl | July 27, 1926 |